UNITED STATES PATENT OFFICE.

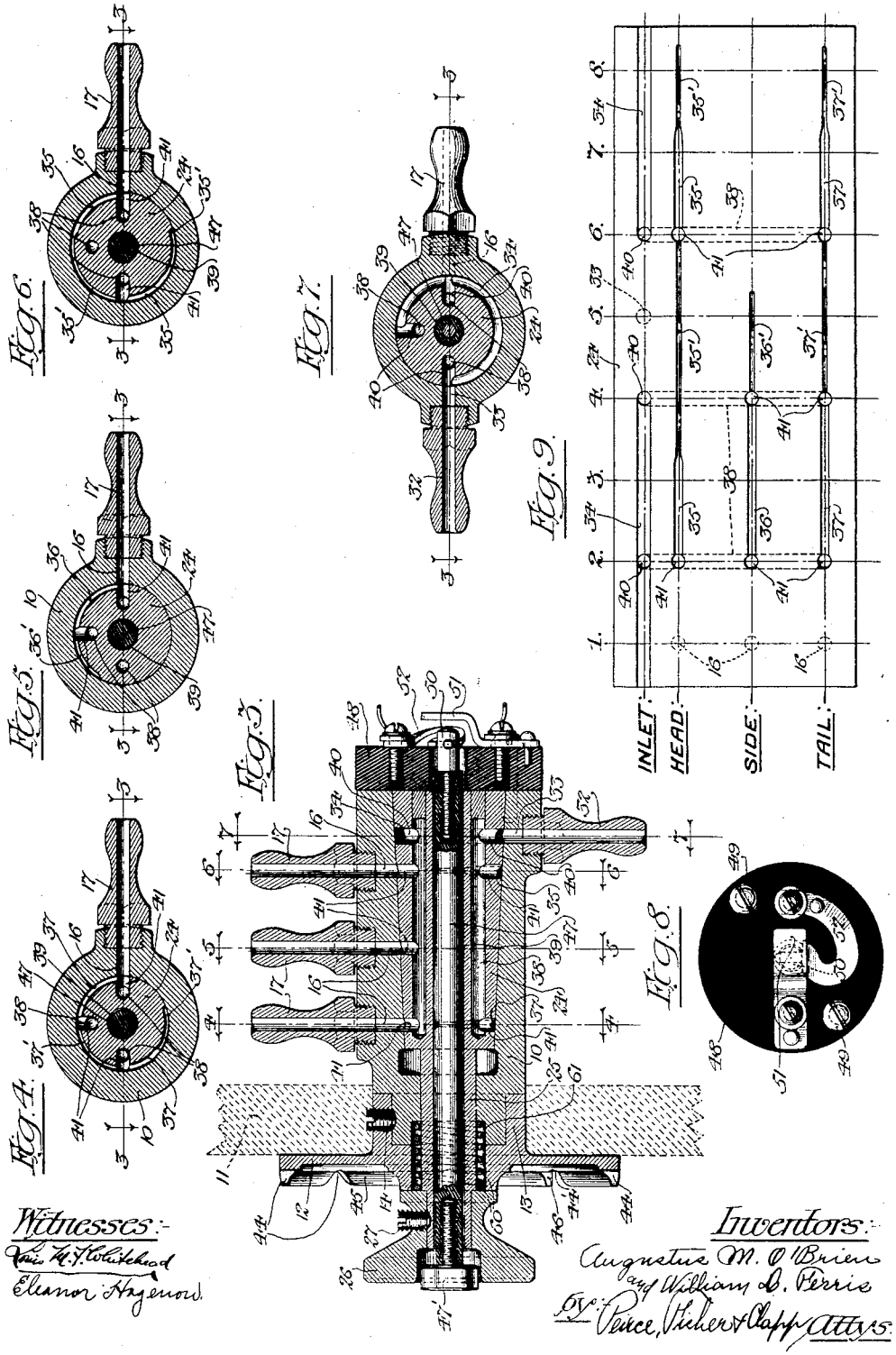

AUGUSTUS M. O'BRIEN AND WILLIAM D. FERRIS, OF SHARON, PENNSYLVANIA.

CONTROLLER FOR AUTOMOBILE GAS-LAMPS.

1,113,817.  Specification of Letters Patent.  Patented Oct. 13, 1914.

Application filed August 28, 1912. Serial No. 717,629.

*To all whom it may concern:*

Be it known that we, AUGUSTUS M. O'BRIEN and WILLIAM D. FERRIS, citizens of the United States, and residents of Sharon, county of Mercer, and State of Pennsylvania, have invented certain new and useful Improvements in Controllers for Automobile Gas-Lamps, of which the following is a full, clear, and exact description.

The improvement relates to controllers for automobile gas lamps and seeks to provide improved means for variably controlling the supply of gas to the different lamps of the automobile, which can be conveniently mounted adjacent the driver's seat and which is provided with means for indicating the amount of gas passing through the different lamps.

A further object of the invention is to provide an electric contact device in connection with the controller, whereby the gas may be lighted in the different lamps.

The invention consists of the features of improvement hereinafter set forth, illustrated in the preferred form in the accompanying drawings and more particularly pointed out in the appended claims.

Figure 1:
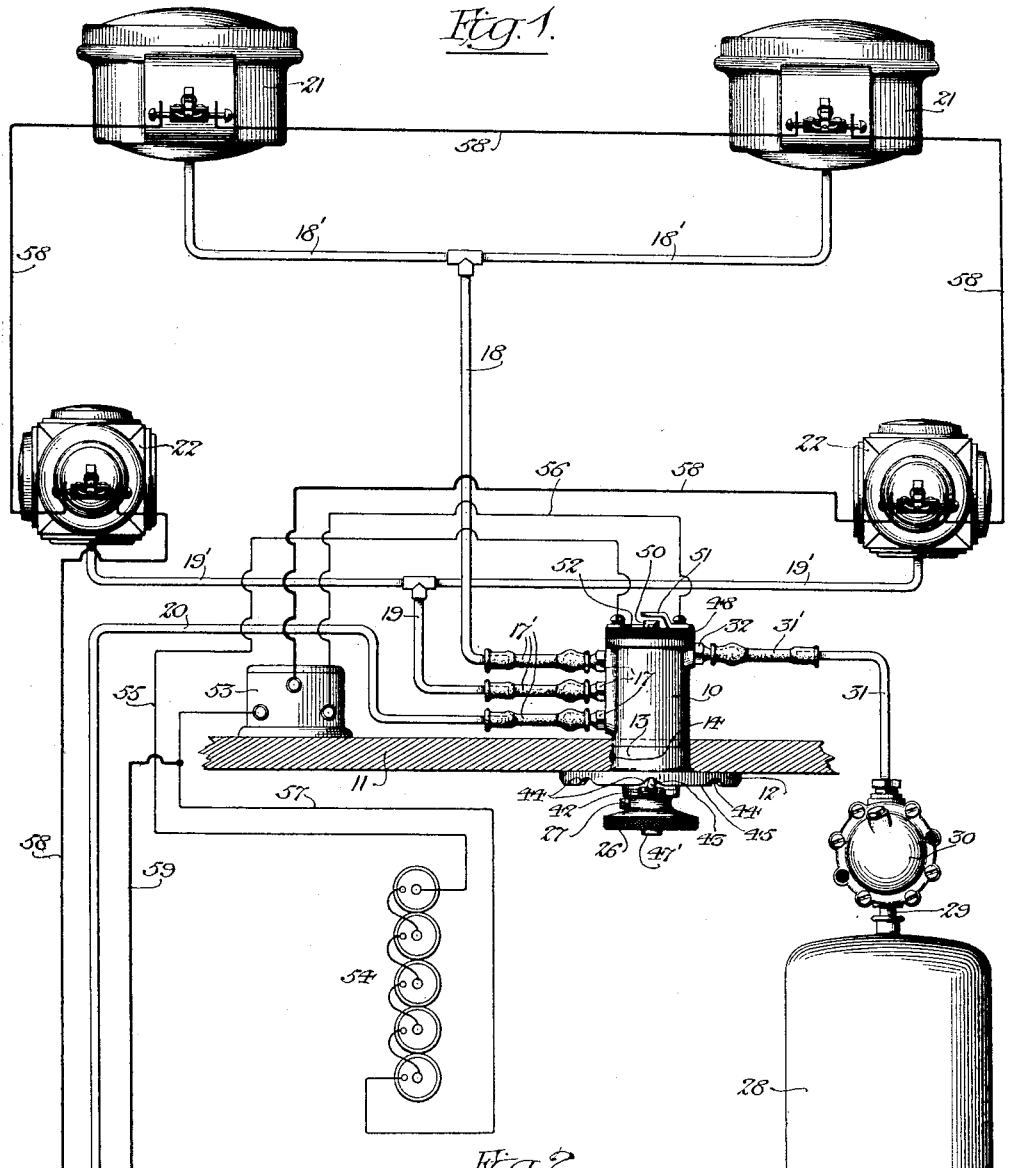
Figure 2:
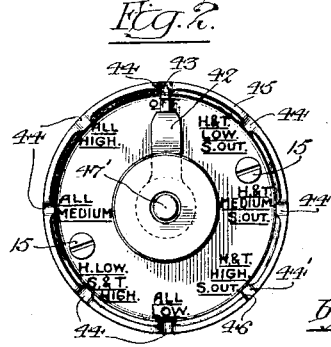

In the drawings, Figure 1 is a diagrammatic view indicating the arrangement of the automobile lamps and the improved controller. Fig. 2 is a view in elevation of the face of the controller. Fig. 3 is a horizontal section of the improved controller on the lines 3—3 of Figs. 4, 5, 6 and 7 and in position for admitting a full supply to all of the lamps. Figs. 4, 5, 6 and 7 are cross sections on the lines 4—4, 5—5, 6—6 and 7—7 of Fig. 3. Fig. 8 is a view of the inner end of the controller showing the electric contact device. Fig. 9 is a diagrammatic development of the surface of the controller valve.

The improved controller comprises a valve casing 10 which is preferably cylindrical and is adapted to be mounted within an opening in the dashboard 11 of the automobile. An indicating dial 12 is provided with a hub-portion 13 which fits over the reduced outer end of the valve casing and is secured thereto by a set screw 14. The dial 12 abuts against the outer face of the dashboard 11 and screws 15 extending through the dial secure the controller to the dashboard. The valve casing is provided on one side with a longitudinally extending series of discharge passages 16 which communicate with nipples 17 mounted on the side of the valve casing. In the form shown, there are three of these discharge passages and nipples and they are connected by rubber coupling pipes 17′ to a series of supply pipes 18, 19 and 20. The pipe 18 has two branches 18′ leading to the headlights 21 of the automobile. The pipe 19 has branches 19′ leading to the side lights 22 of the automobile, and pipe 20 leads to the tail light 23.

The flow through the discharge passages 16 and supply pipes to the lamps is controlled by a valve 24 in the casing, which is preferably in the form of a conical plug valve which snugly fits within the correspondingly shaped bore of the casing. The inner end of the valve 24 is provided with a stem 25 which extends through the outer end of the casing and through the dial 14, and a shifting handle or knob 26 is fixed to the reduced outer end of the stem in any suitable manner, for example, by means of a set screw 27. The gas is supplied to the controller from a tank 28 in which it is contained under high pressure. A pipe 29 leads from the tank at an automatic pressure regulator 30 by which the pressure is greatly reduced and maintained uniform within a pipe 31 leading therefrom. The pipe 31 is connected by a rubber coupling pipe 31′ and engages a nipple 32 which is preferably fixed to the valve casing on the side opposite the discharge passages 16 and which communicates with an inlet passage 33 extending through the side wall of the casing. A series of grooves are formed in the contacting, conical face of the valve or of the valve casing and are arranged to coöperate with suitable ports or passages of the valve to variably regulate the flow of the gas through the controller and the supply to the different lamps as the valve is rotated. These grooves are preferably formed in the surface of the valve. As shown, the inner end of the valve is provided with a wide, deep groove 34 which is arranged to register with the inlet passage 33 and which extends nearly around the valve. This groove is preferably interrupted through a short arc so that a blank portion is formed on the face of the valve and which, in one position of the valve, closes the inlet passage 33. A series of comparatively shallow grooves 35, 36 and 37 are formed in the surface of the valve casing and are arranged to register respectively with the discharge passages leading to the supply pipes to the different lamps. The grooves 35, 36 and 37 are all in communication with the groove 34, preferably through the medium of passages 38 which are bored longitudinally through the valve between its central bore 39 and its periphery. In the particular construction shown, there are three of these longitudinal passages in the valve arranged at 90° apart, and after these passages are bored in the valve, the inner ends thereof are plugged up. The passages 38 are in communication with the groove 34 by a series of radial ports 40 and with the several passages 35, 36 and 37 by a series of ports 41. The groove or passage 34, the passages 38 and the ports 40 and 41 are of such size that when the groove 34 registers with the inlet passage 33 and one of the ports 41 registers with one of the discharge passages 16, the maximum amount of gas will flow through the controller to the lamp or lamps in communication with such discharge passage. The grooves 35, 36 and 37 are considerably smaller in size, so that when one of the grooves registers with one of the discharge passages, the amount of gas supplied to the lamp or lamps connected thereto is cut down and the light emitted thereby diminished. Preferably, each of the grooves 35, 36 and 37 is provided with still further restricted portions 35', 36' and 37', so that the light emitted by the different lamps can be still further diminished. That is to say, the controller is preferably provided with means whereby the light emitted from the different lamps may be high, medium or low. The grooves or passages 35, 36 and 37 do not extend entirely around the valve, so that a blank portion is provided which is adapted to close the discharge passages 16 at the same time that the inlet passage is closed by the valve.

The dial and the valve are provided with means for indicating the different positions of the valve relatively to the different discharge passages to thereby show whether or not the gas is passing to the different lamps of the machine and also indicating the amount of gas supplied to the different lamps. For this purpose, the hub of the knob 26 is provided with a projecting arm 42 to which is fixed a spring finger 43. The spring finger 43 is arranged to engage with a series of V-shaped notches 44 provided in a circular rib or flange 45 which is formed on the face of the dial 14 near its periphery. The dial is provided on its face with suitable indications and the finger 43 coöperates therewith to indicate the different positions of the valve. The spring finger 43 also serves by engagement with the notches 44 to hold the valve against accidental movement. In the particular construction shown, these parts are arranged to hold the valve in eight different positions. In the first position of the valve, indicated by the numeral 1 in the diagrammatic Fig. 9, the blank portions of the valve surface are opposite the inlet passage 33 and the discharge passages 16, so that the flow of gas through the controller and to the separate lamps is cut off. In the second position of the valve, the groove 34 registers with the inlet passage 33 and three of the ports 41 which are arranged in line register with the discharge passages 16, so that a full supply of gas is furnished to all of the lamps of the automobile to give a maximum amount of light. In the third position of the valve, the gas reaches the discharge passages 16 through the restricted grooves 35, 36 and 37, and the amount of gas supplied is cut down to give a medium amount of illumination. In the fourth position of the controlling valve, two of the ports 41 are in register with the discharge passages which lead to the tail and side lights, but the small groove portion 35' is opposite the discharge passage leading to the headlights, so that the tail and side lights of the machine are high, while the headlights are low, as required in some cities. In the fifth position of the valve the gas reaches the discharge passages 16 through the narrow groove portions 35', 36' and 37', so that all of the lights are low. The intermediate groove of the valve is shorter than the other grooves, so that, in the sixth, seventh and eighth positions of the valve, the side light is out and the ports 41 and grooves 35, 35' and 37, 37' are so arranged that in these different positions the head and tail lights are high, medium and low, respectively.

It should be noted that when once gas is admitted to any of the lamps, the supply thereto is maintained as the valve is shifted to vary the flow, until the supply to the particular lamp is finally cut off. That is to say, the grooves 35, 36 and 37 and the further restricted portions 35', 36' and 37' thereof form by-passes between the ports 41 through which gas will flow to the several discharge passages as the valve is shifted. In this way the supply of gas is maintained when the valve is adjusted to vary the supply. But when the valve is shifted to its 6th position, the supply of gas through the pipe 19 to the side lights is cut off, while that to the head and tail lights is maintained. If the valve is then turned in backward direction, the gas will leak through the pipe 19 and escape through the side lamps. To prevent this, the notch 44' of the dial corresponding to the sixth position of the valve is provided on one side with an abrupt shoulder 46 which prevents the backward turning of the valve after it has reached this position. The other side wall of this notch and the side walls of all of the other notches are rounded or beveled, so that, while the interlocking of the finger therewith will hold the valve against accidental movement, it can be readily shifted by the knob 26 and can be shifted in either direction from any position except the sixth position, at which point, as stated, the supply of gas to the side lights is cut off.

To provide convenient means for igniting the gas of the several lamps when the supply is turned on, a contact device is mounted on the gas controller. The ports and passages of the valve and valve casing are so arranged that they do not pass through the central axial bore 39 of the valve. A shifter rod 47 extends through this bore and is provided at its outer end with a button 47′ which is preferably arranged in a recess in the outer face of the knob 26. The inner end of the shifter rod extends through the central opening of a disk 48 which is formed of insulating material and which is fastened to the inner end of the valve casing 10 by screws 49. The shifter rod 47 is preferably formed of fiber or like insulating material and, at its inner end, it is provided with a metallic contact piece 50 which is adapted to engage a contact piece 51 fixed to the face of the insulating disk 48. A metallic spring finger 52 fastened to the face of the disk engages the contact piece 50 and normally holds it away from the contact 51. The several lamps are provided with suitable igniters which are arranged in a series in a secondary circuit extending from a spark coil 53 which is secured to the dashboard 11. The spark coil and the contacts 50 and 51 are arranged in a primary circuit leading from the battery 54. When the controller is shifted to admit gas to any of the lamps, the push button 47′ is pressed to engage the contacts 50 and 51. The current then flows from the battery 54 by means of the conductor 55 to the spring finger 52, contacts 50 and 51, thence by a conductor 56 to the spark coil 53 and back to the battery by a conductor 57. Current then flows from the spark coil by a series of conductors 58 through the igniters of the several lamps in series and thence back to the spark coil by a conductor 59.

To hold the plug valve securely against its correspondingly shaped conical seat in the valve casing, a spring 60 is coiled about the stem of the valve and is arranged within the enlarged upper end portion of the bore of the valve casing. The inner end of the spring engages a shoulder 61 in the upper portion of the valve casing and the outer end of the spring engages the operating knob or handle on the valve stem. The spring thus serves to securely press the conical valve in engagement with its seat and, as all of the ports and passages are formed in the conical contacting faces of these parts, leaking of the gas is effectively prevented.

By means of the improved controller, the supply of gas can be admitted to and cut off from the lamps, as desired, and regulated to vary the amount of light. Whenever the gas is turned on, any of the lamps can be easily ignited from the driver's seat. The arrangement of the electric contacting device on the controlling valve is extremely convenient and avoids the necessity of providing other means for mounting the igniting contact device.

It is obvious that numerous changes may be made in the details set forth without departing from the essentials of the invention as defined in the claims.

We claim as our invention:—

1. A controller for automobile gas lamps comprising a valve casing having inlet and discharge passages, a rotary valve in said casing having a bore extending axially therethrough, said valve having a passage extending therethrough and arranged entirely outside of and independent of said central bore for controlling communication between the inlet and discharge passages of said casing, an electrical contact device mounted on the inner end of said casing and a shifter for said contact device extending through said central bore, substantially as described.

2. A controller for automobile gas lamps comprising a valve casing having inlet and discharge passages, a rotary plug valve in said casing having a stem extending through the outer end of said casing, said valve having a passage extending therethrough and arranged entirely outside of and independent of said central bore for controlling communication between the inlet and discharge passages of said casing, a shifter for said valve on the outer projecting end of said valve stem, an electrical contact device mounted on the inner end of said valve casing and a shifting rod for said contact device extending through the central bore of said valve stem and valve, substantially as described.

AUGUSTUS M. O'BRIEN.
WILLIAM D. FERRIS.

Witnesses:
  JOHN H. FITZGERALD,
  JEREMIAH L. FITZGERALD.